United States Patent
Yoshida

(10) Patent No.: US 7,130,089 B2
(45) Date of Patent: Oct. 31, 2006

(54) ORIGINAL DOCUMENT SCANNING APPARATUS

(75) Inventor: Katsunobu Yoshida, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/202,902

(22) Filed: Jul. 26, 2002

(65) Prior Publication Data

US 2003/0038991 A1    Feb. 27, 2003

(30) Foreign Application Priority Data

Jul. 27, 2001    (JP) ............................. 2001-228001

(51) Int. Cl.
*H04N 1/04*    (2006.01)

(52) U.S. Cl. .................. 358/474; 358/505; 358/497; 358/496; 399/206; 399/471; 250/208.1

(58) Field of Classification Search ............... 358/474, 358/505, 497, 483, 482, 496; 399/206, 471; 250/208.1
See application file for complete search history.

(56) References Cited

U.S. PATENT DOCUMENTS 5,610,731 A * 3/1997 Itoh ........................ 358/496
5,801,851 A * 9/1998 Sheng ...................... 358/497
5,933,248 A * 8/1999 Hirata ...................... 358/406
6,373,613 B1 * 4/2002 Sheng ...................... 359/196

FOREIGN PATENT DOCUMENTS

| CN | 2367036 Y | 3/2000 |
|---|---|---|
| CN | 2408512 Y | 11/2000 |
| JP | 2000021081 | 4/2000 |

OTHER PUBLICATIONS

Korean Office Action bearing No. 9-5-2004-006994693.
EPO Office Action in counterpart application 02016761, dated Aug. 20, 2004.

* cited by examiner

*Primary Examiner*—Douglas Q. Tran
*Assistant Examiner*—Negussie Worku
(74) *Attorney, Agent, or Firm*—Fitzpatrick, Cella, Harper & Scinto

(57) ABSTRACT

An original document scanning apparatus includes a supporting plate for supporting an original document; a scanning unit, movable relative to the supporting plate, for scanning the original document; a spacer member for regulating a clearance between the supporting plate and the scanning unit; wherein spacer member is in line contact to the supporting plate along a line extending in a moving direction of the scanning unit.

5 Claims, 5 Drawing Sheets

ORIGINAL DOCUMENT SCANNING APPARATUS

FIELD OF THE INVENTION AND RELATED ART

The present invention relates to an original document scanning apparatus for reading an original image.

An image forming apparatus is known in which an image (original image) on an original document is read, and the read original image is printed on a recording material such as a recording paper. As for the reading of the original image, there are known a so-called stationary original scanning mode and a continuous scanning mode.

In the continuous scanning mode, a contact image sensor (CIS) or the like for reading the original image is placed stationarily under the original supporting platen glass, and the original document is passed on the original supporting platen glass above the CIS (image reading region). In the stationary original scanning mode, on the other hand, the original is placed on the original supporting platen glass, and the original image is read while the CIS is moved in a predetermined main scan direction. When the original image is read in the stationary original scanning mode, the CIS is generally moved along and in parallel with the original supporting platen glass.

The CIS normally uses Cellphox lenses which has a small depth of focus. If the distance between the original and the CIS in the case that depth of focus is small, the blurriness of the image arises, and therefore, the distance is required to be constant. In order to maintain the constant distance, it is known that spacer member interrelated with the CIS is contacted at a point to the original supporting platen glass, so that CIS is moved in the main scan direction while it is kept close to the original supporting platen glass. By the point contact of the spacer member to the original supporting platen glass, the sliding resistance is made smaller to reduce the driving torque required for the movement of the CIS, and in addition, to reduce the contamination of the original supporting platen glass due to the sliding. However, when the spacer member is contacted to the original supporting platen glass at a point, the pressure is concentrated on the point of the spacer member which is in point contact to the original supporting platen glass, with the result of tendency of quick wearing of the contact portion. When the contact portion is worn, the distance between the original and the CIS becomes short with the result of defocusing. If this occurs, the original image is not correctly read.

SUMMARY OF THE INVENTION

Accordingly, it is a principal object of the present invention to provide an original document scanning apparatus with which the driving torque of the scanning unit is reduced. It is another object of the present invention to provide an original document scanning apparatus in which the contamination of the original carriage is suppressed.

According to the present invention, there is provided an original document scanning apparatus comprising a supporting plate for supporting an original document; a scanning unit, movable relative to said supporting plate, for scanning the original document; a spacer member for regulating a clearance between said supporting plate and said scanning unit; wherein spacer member is in line contact to said supporting plate along a line extending in a moving direction of said scanning unit.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
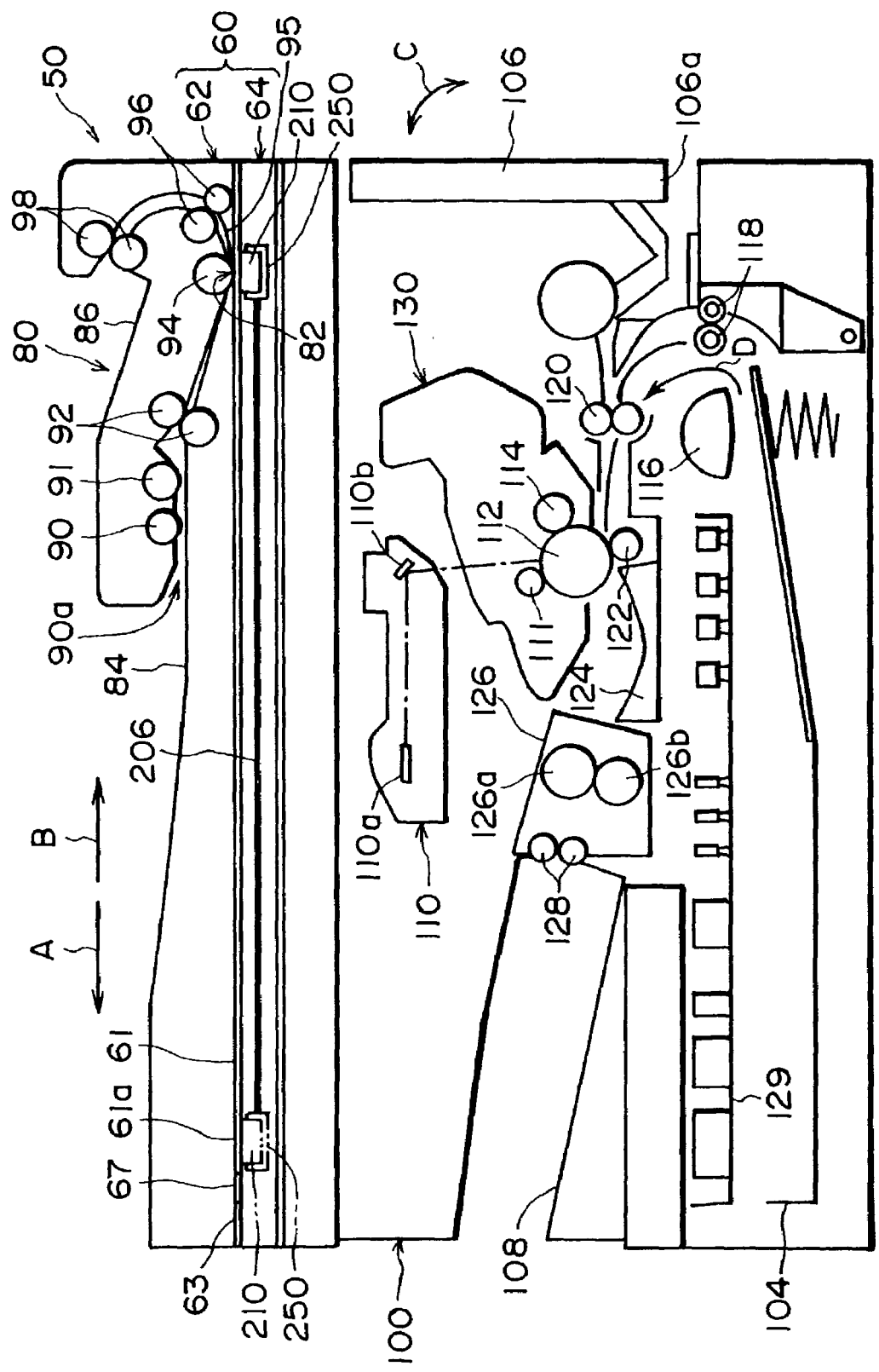
FIG. 1 is a schematic view illustrating an internal structure of the image forming apparatus provided with the original document scanning apparatus according to an embodiment of the present invention.
Figure 2:
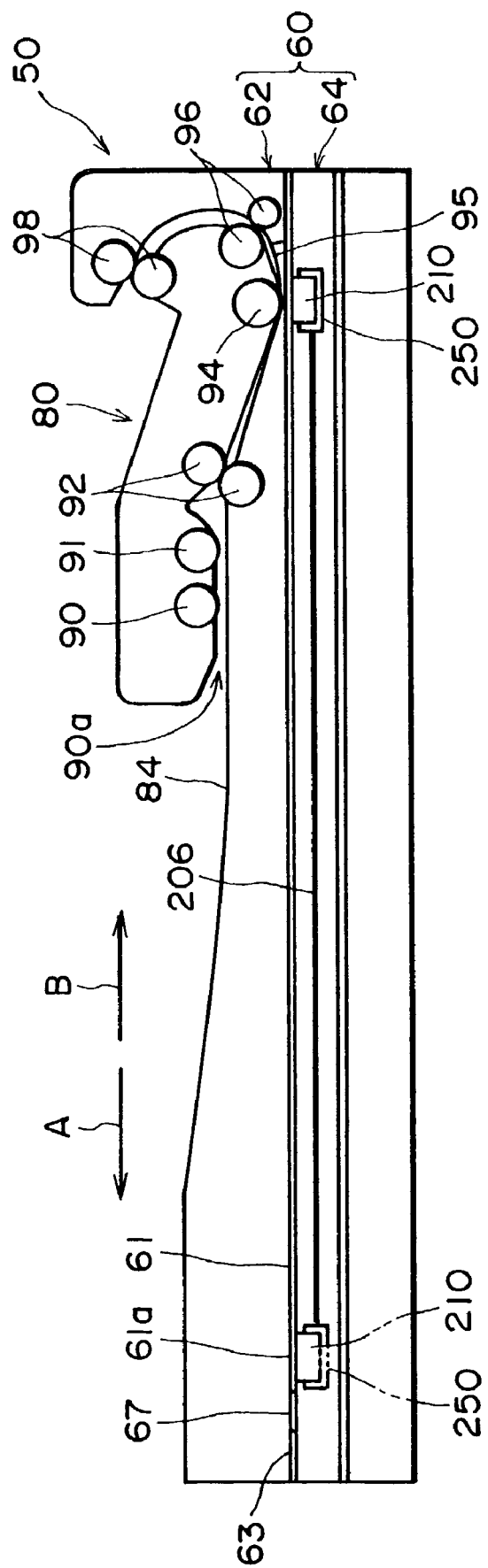
FIG. 2 is an enlarged view of a first casing.
Figure 3:
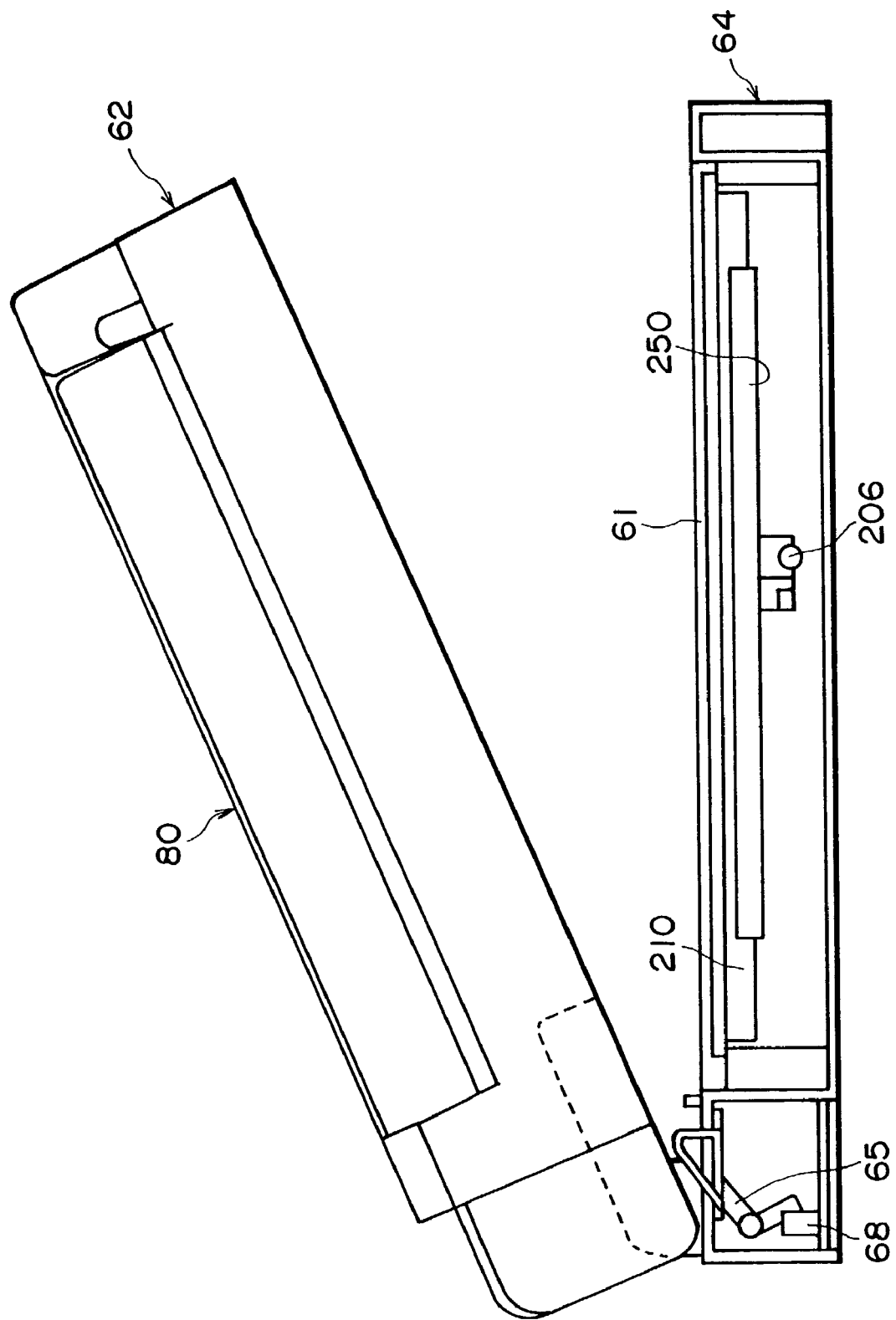
FIG. 3 is a side view of the first casing in which the original cover is opened.

Referring to FIG. 1 to FIG. 3, an embodiment of the present invention will be described.

FIG. 1 is a schematic view illustrating an internal structure of the image forming apparatus provided with the original document scanning apparatus according to an embodiment of the present invention. FIG. 2 is an enlarged view of a first casing. FIG. 3 is a side view of the first casing in which the original cover is opened.

A digital copying machine 50, which is an example of an image forming apparatus of the present invention), comprising a first assembly 60 including parts for reading an image on an original document, and a second assembly (image formation station) 100 including parts for printing an image on a recording material. The second assembly 100 is disposed below the first assembly 60 as shown in the Figure. Therefore, the first assembly 60 is placed on the second assembly 100. The first assembly 60 is movable in the directions indicated by arrows A, B along the upper surface of the second casing 100.

On the top surface of the copying machine 50, there is provided an openable original cover 62 which is generally has a rectangular parallelopiped shape.

Figure 4:
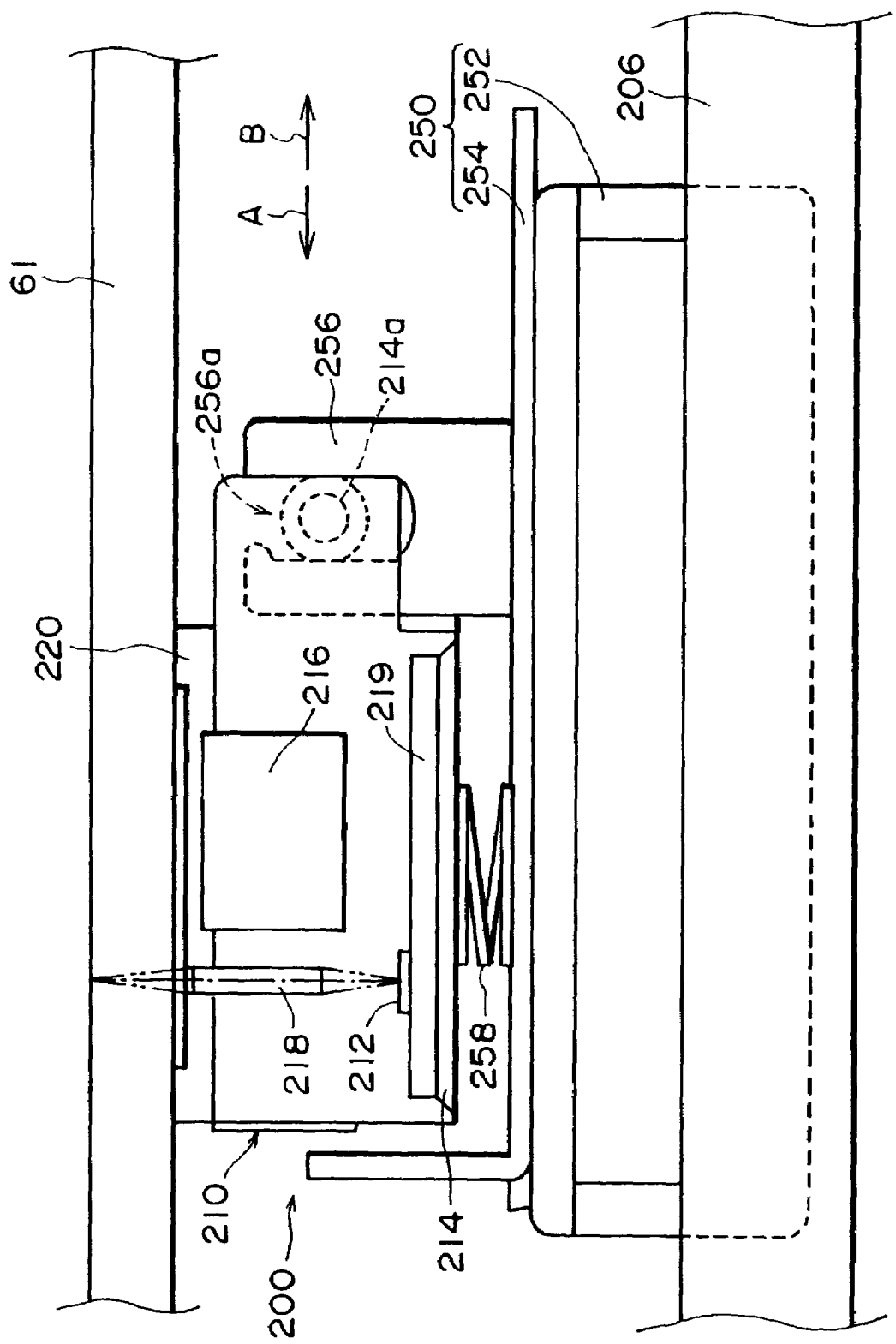
FIG. 4 is a schematic view of the scanning apparatus.

Below the original cover 62, there is provided an optical device casing 64 which cases a scanning unit 200 (FIG. 4). The scanning unit 200 includes a light source LED (unshown) and the like. A top surface of the casing 64 has an original supporting platen glass 61 on which an original document is placed (an example of a supporting plate). The first assembly 60 is constituted by the original cover 62 and the casing 64. When the original cover 62 is opened, an opening and closing detecting lever 65 rotates in response to which an opening and closing sensor 68 detects the event of opening of the original cover 62.

At one end portion of the original supporting platen glass 61 which is opposite to the fixing device 126 with the photosensitive drum 112 therebetween, an image reading region 82 for reading the original is provided. Slightly downstream of the image reading region 82 in the direction of an arrow B, a feeding guide support 95 is provided to guide, toward a sheet discharge tray 86, the original fed to the image reading region 82. The feeding guide support 95 is elongated in a direction perpendicular to the directions indicated by arrows A, B. On the other hand, at the other end portion of the original supporting platen glass 61 opposite to the end provided with the feeding guide support 95, there is provided an abutment plate 67 to which the original placed on the original supporting platen glass 61 is abutted. The abutment plate 67 is elongated in a direction perpendicular to the directions indicated by the arrows A, B.

The original cover 62 contains an automatic original document feeding device 80 for automatically feeding the original documents. The automatic original document feeding device 80 will be described in detail hereinafter.

In a front side of the second assembly 100 beyond the first assembly 60, an operation panel (unshown) is provided to permit set the number of the copies or the like. At a lower portion of the second casing 100, a cassette 104 for accommodating a plurality of cut sheets is provided and is retractable relative to the second assembly 100. A right-hand wall of the second casing 100 is provided with a manual feed tray 106 having a rectangular shape for permitting feeding of a small size recording paper such as a post card. The manual feed tray 106 is rotatable in the direction indicated by an arrow C about a bottom edge 106*a* to a position for supporting a recording material. At a left side of the second assembly 100, there is a space in which sheet discharge tray 108 is provided for stacking the discharged recording materials.

When an image is formed in the copying machine 50, the first assembly 60 is moved in the direction indicated by the arrow B to the image formation position (the position shown in FIG. 1). With the copying machine 50, either one of a stationary original scanning mode and a continuous scanning mode is selectable upon the formation of the image on the recording material. In the stationary original scanning mode, the original document is placed stationarily on the original supporting platen glass 61, and a CCD element 212 (an example of the reading means) (FIG. 4) or the like is moved in the direction of the original supporting platen glass 61 (scanning direction) below the original supporting platen glass 61. In the continuous scanning mode, the CCD element 212 is placed stationarily below the image reading region 82, and the original document is fed to the image reading region 82 by the automatic original document feeding device 80, during which the image of the original is read by the CCD element 212 at the image reading region 82.

When the stationary original scanning mode is selected, the original cover 62 is first opened, and the original carriage carrying the original document on its top surface is abutted to the abutment plate 67, by which it is placed at the correct position, and the original is confined by the original cover 62. Then, in response to depression of a predetermined operation button or the like, the light emitted from LED light source and guided by a light guide member 216 (FIG. 4) illuminates the original, and the CCD element 212 built in the optical device casing 64 scans the original from the position shown by chain lines in the direction of the arrow B. The image of the original is read by the CCD element 212. The read image is converted to a digital signal, which is sent to the laser scanner 110. The platen glass 61 is fixed on a rectangular original carriage frame 63 provided in the optical device casing 64. The CCD element 212 is driven by a driving motor (unshown) through a driving belt (unshown) or the like together with the scanning unit 250, and is guided by the guiding shaft 206 to move in the directions of arrows A, B.

The description will be made as to the continuous scanning mode.

For the continuous scanning mode, the copying machine 50 is provided with an automatic original document feeding device 80. The automatic original document feeding device 80 functions to automatically feed the original document such that original document passes by the image reading region 82 by means of which the image on the original document is read. The image reading region 82 is provided at an upstream side of the original supporting platen glass 61 with respect to the direction of the arrow B as described hereinbefore, and is extended in a direction perpendicular to the direction of the arrow B. In the case that continuous scanning mode is used in the copying machine 50, the CCD element 212 is placed stationarily at side across the original supporting platen glass 61 from the image reading region 82 (lower side of the original supporting platen glass 61).

The image reading region 82 is provided at one end portion of the original supporting platen glass 61 which is across the photosensitive drum 112 from the fixing device 126. For the continuous scanning mode, the CCD element 212 is disposed stationarily below the image reading region 82.

The automatic original document feeding device 80 comprises an original document stacking tray 84 on which the original document is placed, and an original sheet discharge tray 86 on which the original document passed through the image reading region 82 is received. The automatic original document feeding device 80 has a plurality of rollers for transporting the original stacked on the original document stacking tray 84 to the original sheet discharge tray 86 through the image reading region 82 (sheet feeding rollers 90 and registration rollers 92).

The original document placed on the original document stacking tray 84 is fed through the sheet feeding port 90*a* to the separation rollers 91 by a pick-up roller 90, and is further fed to a pair of registration rollers where inclination of the document is corrected. The inclination-corrected original document is fed to a platen roller 94 by the pair of registration rollers and is passed through the image reading region 82.

Below the image reading region 82, the CCD element 212 is disposed stationarily, and the original passing through the image reading region 82 is illuminated by the LED (unshown) during which the image is read by the CCD element 212. The read image is converted to a digital signal, which is sent to the laser scanner 110.

The original document having passes through the image reading region 82 is guided to the feeding rollers 96 by a feeding guide support 95. The feeding rollers 96 feed the original document to the sheet discharging rollers 98 while reversing the original document. The original document fed to the sheet discharging rollers 98, is discharged to the original sheet discharge tray 86 by the sheet discharging rollers 98.

In this manner, in the copying machine 50 described above, the read image of the original document is converted to a digital signal which is sent to the laser scanner 110, in either of the continuous scanning mode and the stationary original scanning mode. The signal supplied to the laser scanner 110 is converted to a laser beam which illuminates the photosensitive drum 112 by way of a scanner mirror 110*a* rotating at a high speed and a folding mirror 110*b*. The photosensitive drum 112 is charged uniformly by a charger 111, and an electrostatic latent image is formed on the photosensitive drum 112 by the application of the laser beam. The electrostatic latent image is developed by a developer supplied by the developing roller 114 so that developed image is formed.

On the other hand, a recording material such as a recording paper is fed from the cassette 104 by a sheet feeding roller 116 in the direction indicated by an arrow D (sheet feeding direction), and is then fed to a transfer device 122 by the feeding rollers 118 and the registration rollers 120. In the transfer device 122, a developed image is transferred from the photosensitive drum 112 onto the recording material thus fed. The recording material now having the developed image transferred thereonto, is fed to a fixing device 126 by a feeding device 124. The fixing device 126 comprises a heating roller 126a and a pressing roller 126b, by which the recording material is nipped therebetween and fed, during which the developed image is fixed on the recording material. The recording material on which the developed image is fixed in this manner is discharged by sheet discharging rollers 128 to a sheet discharge tray 108.

It is possible to feed the recording material from the manual feed tray 106, and the process of forming the image on the recording material fed from the manual feed tray is the same. The copying machine 50 comprises base plate 129 having a voltage source for driving various parts and electrical parts.

The copying machine 50 further comprises various parts and members, as described above. Of these parts, the charger 111, the photosensitive drum 112 and the developing roller 114 are built in a process cartridge 130. The process cartridge 130 is detachably mountable as a unit to the copying machine 50.

Referring to FIG. 4, the description will be made as to the scanning unit 200 built in the optical device casing 64.

FIG. 4 is a schematic view showing the scanning unit.

The scanning unit 200 is provided with a reading portion 210 on which the CCD element 212 is fixed, and a supporting portion 250 on which reading portion 210 is mounted.

The supporting portion 250 includes a scanning member 252 in the form of a box supported on the guiding shaft 206 for movement in the directions of arrows A, B, and a supporting plate 254 fixed on the upper surface of the scanning member 252. On the top surface of the supporting plate 254, metal plate 256 is erected and fixed. The metal plate 256 is provided with an elongated bore 256a extending in the perpendicular direction. To the supporting plate 254, a bottom end portion of a coil spring 258 (an example of urging means) is fixed. The top end portion of the coil spring 258 is fixed on the bottom surface of a fixing member 214 to which the CCD element 212 is fixed. Therefore, the fixing member 214 is urged toward the original supporting platen glass 61 (upward) by the coil spring 258. The CCD element 212 and the fixing member 214 and the like constitutes a reading portion 210.

Figure 5:
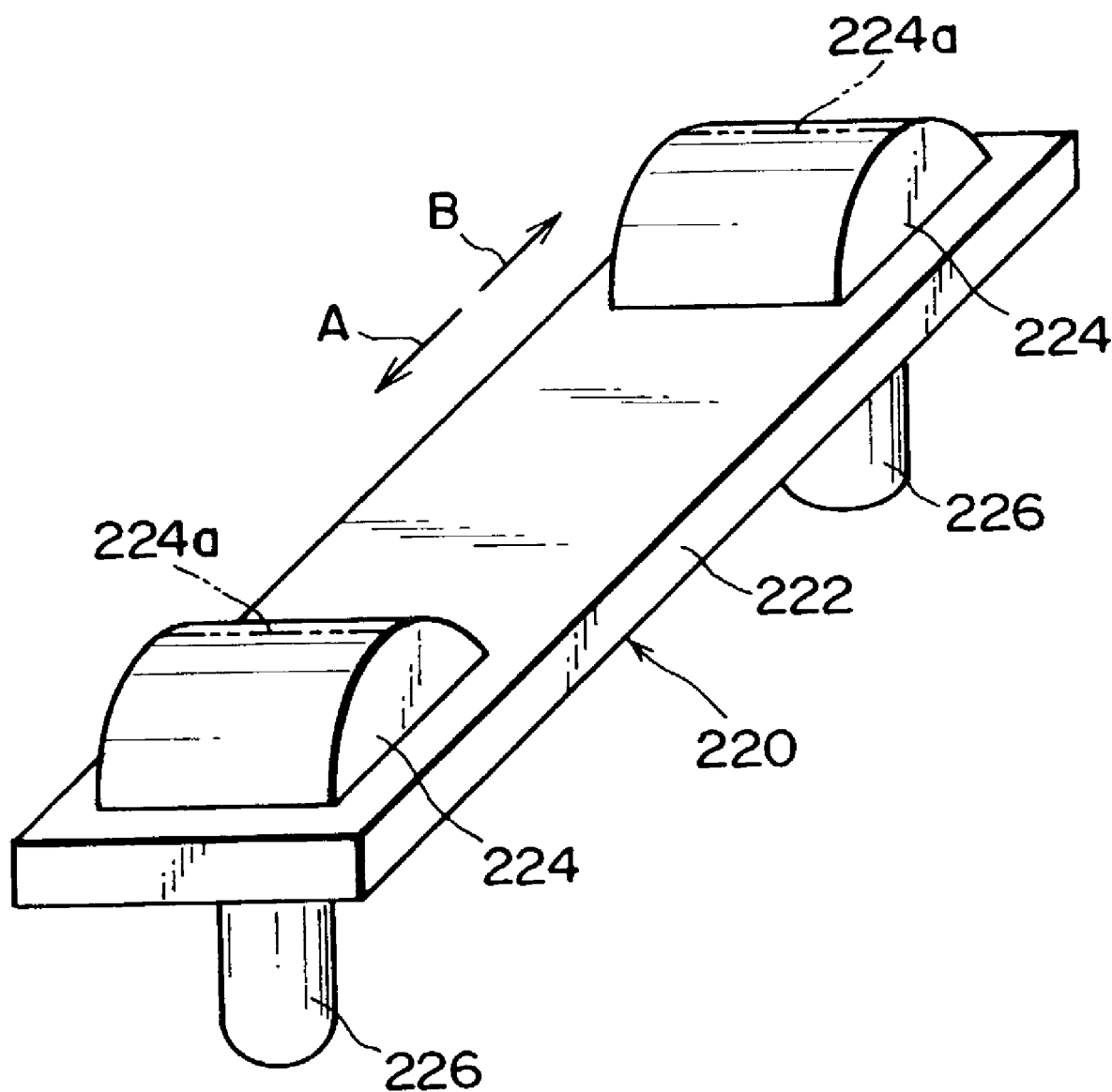
FIG. 5 is a perspective view of a spacer member.

The fixing member 214 is provided with a projection 214a which is engaged in the elongated bore 256a. To the fixing member 214, there are fixed light guide member 216 for guiding the light emitted from the LED light source to the original, a Cellphox lens array 218 through which the light reflected by the original is passed, and a substrate 219 on which the CCD elements 212 are mounted. To the fixing member 214, there is further fixed a spacer member 220 contacting to the original supporting platen glass 61. The spacer member 220 is fixed at the end portions of the fixing member 214 with respect to the direction (longitudinal direction of the fixing member 214) perpendicular to the main scan direction (directions of arrows A, B). Referring to FIG. 5, the description will be made as to the details of the spacer member 220.

FIG. 5 is a perspective view of Example 1 of the spacer member.

The spacer member 220 is press-contacted to the original supporting platen glass 61 by an urging force of the coil spring 258 by which the clearance between the original document placed on the original supporting platen glass 61 and the CCD element 212. Since the Cellphox lens array 218 has a small depth of focus, the variation of the clearance result in the image blurriness. Therefore, the spacer member 220 preferably has a high anti-wearing property.

One spacer member 220 is fixed at each of the opposite longitudinal ends of the fixing member 214. Each of the spacer members 220 comprises a base plate 222 extending in the directions of arrows A, B which are the main scan directions perpendicular to the moving direction of the scanning unit, and a contact portion 224 of a resin material provided at the opposite ends of the upper surface of the base plate 222 with respect to the longitudinal direction (directions of arrows A, B), and a leg portion 226 provided at each of the opposite ends (below the contact portion 224) of the lower surface of the base plate 222. The leg portion 226, as shown in FIG. 4, is inserted in a recess formed in the fixing member 214, by which the spacer member 220 is fixed in the fixing member 214.

The contact portion 224 has a semi-cylindrical shape provided by cutting a cylinder in the direction of height. The cut surface thereof is contacted to the base plate 222 such that direction of the height of the cylinder is codirectional with the moving direction of the scanning unit which is substantially perpendicular to the directions of the arrows A, B. A line 224a at the highest position of the outer surface of the contact portion 224 is in line contact with the original supporting platen glass 61. Since the scanning unit 200 (FIG. 4) moves in the directions of arrows A, B, the line 224a slides in its longitudinal direction (directions of arrows A, B) while it is in line contact with the original supporting platen glass 61.

Since the spacer member 220 slides while it is in line contact with the original supporting platen glass 61, the sliding area is narrower than in the case of a spacer member which is in surface contact with the original supporting platen glass 61. Therefore, the influence of variation of the roughness of the surface (contact surface) of the original supporting platen glass 61 which is contacted to the spacer member 220 and/or the foreign matter deposited on the contact surface, is small. As a result, the clearance between the CCD element 212 and the original supporting platen glass 61 can be maintained correctly at a constant level for a long term. Even when the spacer member 220 and/or the fixing member 214 is externally vibrated, the spacer member 220 is not easily vibrated because of the frictional force between the spacer member 220 and t original supporting platen glass 61, since the spacer member 220 is in line contact to the original supporting platen glass 61. Therefore, the CCD element 212 and the original supporting platen glass 61 are maintained at a constant clearance therebetween. On the other hand, as compared with a spacer member which is in point-contact with the original supporting platen glass 61, the sliding area is wider, so that pressure acting on the spacer member 220 is smaller. For this reason, the spacer member 220 is not easily worn. As a result, the clearance is correctly maintained constant between the CCD element 212 and the original supporting platen glass 61.

As described in the foregoing, according to the present invention, the sliding area of the spacer member relative to the original document stacking plate, and therefore, the required driving torque is small, and the contamination of the original document stacking plate can be reduced, and in addition, the durable lifetime of the spacer member is sufficiently long.

While the invention has been described with reference to the structures disclosed herein, it is not confined to the details set forth and this application is intended to cover such modifications or changes as may come within the purpose of the improvements or the scope of the following claims.

What is claimed is:

1. An original document scanning apparatus comprising:
   a supporting plate for supporting an original document;
   a scanning unit, movable relative to said supporting plate, for scanning the original document;
   spacer members for regulating a clearance between said supporting plate and said scanning unit;
   wherein each said spacer member comprises a base plate fixed to each of opposite longitudinal ends of a fixing member extending perpendicular to a main scan direction, and contact portions provided at opposite ends of an upper surface of the base plate, wherein each of the contact portions has a curved surface to be in line-contact with said supporting plate along a line of the main scan direction and wherein leg portions are provided at each of the opposite ends of a lower surface of the base plate to be inserted in a recess formed in the fixing member.

2. An apparatus according to claim 1, wherein said spacer member has a U shaped cross section.

3. An apparatus according to claim 1, wherein said scanning unit has an image sensor.

4. An apparatus according to claim 1, wherein the contact portions have a semicylindrical shape.

5. An apparatus according to claim 1, further comprising an image forming unit for forming an image on a recording material in accordance with the image read by said scanning unit.

* * * * *

UNITED STATES PATENT AND TRADEMARK OFFICE
CERTIFICATE OF CORRECTION

| | |
|---|---|
| PATENT NO. | : 7,130,089 B2 |
| APPLICATION NO. | : 10/202902 |
| DATED | : October 31, 2006 |
| INVENTOR(S) | : Katsunobu Yoshida |

It is certified that error appears in the above-identified patent and that said Letters Patent is hereby corrected as shown below:

ON THE TITLE PAGE ITEM [56] REFERENCES CITED:

Foreign Patent Documents, "2000021081" should read --2000-021081--.

COLUMN 1:

Line 27, "has" should read --have--; and
Line 29, "CIS in" should read --CIS varies, in--.

COLUMN 2:

Line 31, "invention)" should read --invention--.

COLUMN 3:

Line 10, "set" should read --setting--.

COLUMN 4:

Line 41, "passes" should read --passed--; and
Line 52, "and" should read --or--.

COLUMN 5:

Line 43, "constitutes" should read --constitute--; and
Line 65, "clearance" should read --clearance is established--.

UNITED STATES PATENT AND TRADEMARK OFFICE
CERTIFICATE OF CORRECTION

PATENT NO. : 7,130,089 B2
APPLICATION NO. : 10/202902
DATED : October 31, 2006
INVENTOR(S) : Katsunobu Yoshida It is certified that error appears in the above-identified patent and that said Letters Patent is hereby corrected as shown below:

<u>COLUMN 6</u>:

Line 1, "the variation of" should read --variations in--; and
Line 45, "t" should read --the--.

Signed and Sealed this

Twelfth Day of June, 2007

JON W. DUDAS
*Director of the United States Patent and Trademark Office*